United States Patent [19]

Bennett et al.

[11] 4,253,232

[45] Mar. 3, 1981

[54] METHOD OF MANUFACTURING AN ELECTRIC BATTERY

[75] Inventors: Brian S. Bennett, Barnet; Bruce A. A. Gray, Takeley, Near Bishops Stortford; Michael A. Todd, Welling, all of England

[73] Assignee: Berec Group Limited, London, England

[21] Appl. No.: 15,142

[22] Filed: Feb. 26, 1979

[51] Int. Cl.$^3$ ............................................. H01M 2/24
[52] U.S. Cl. ................................... 29/623.1; 29/418
[58] Field of Search ................... 29/623.1, 623.4, 418, 29/417; 429/148, 159, 175

[56] References Cited

U.S. PATENT DOCUMENTS

| | | | |
|---|---|---|---|
| 1,478,786 | 12/1923 | Hazelett | 29/418 |
| 3,531,861 | 10/1970 | Golbeck | 29/417 |
| 3,650,841 | 3/1972 | Brindley | 429/159 |
| 4,141,712 | 2/1979 | Rogers | 29/418 |

*Primary Examiner*—Daniel C. Crane
*Attorney, Agent, or Firm*—Burns, Doane, Swecker & Mathis

[57] ABSTRACT

In an electric battery comprising a plurality of interconnected cells within an insulating casing, internal connections between the cells and to external terminals are provided by a member which is preformed as a single unitary conducting member, secured in the casing while still in unitary form and subsequently severed in situ in the casing to form a plurality of separate connections.

4 Claims, 7 Drawing Figures

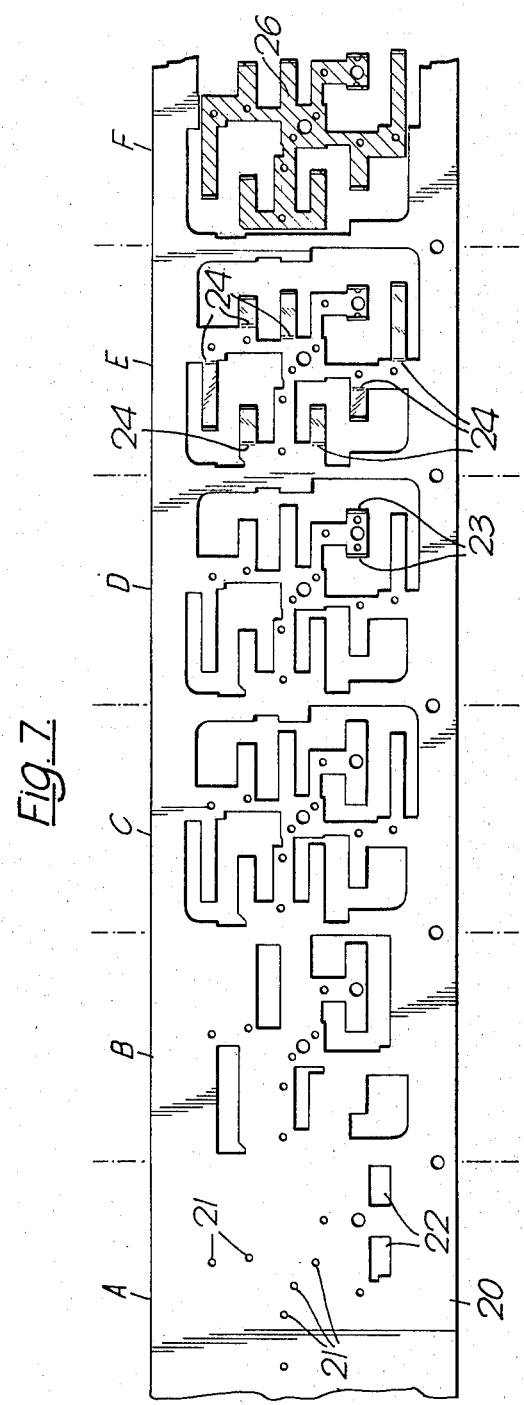

METHOD OF MANUFACTURING AN ELECTRIC BATTERY

BACKGROUND OF THE INVENTION

The invention relates to electric batteries and to methods of manufacturing the same. The invention is particularly applicable to electric batteries of the type which comprise a plurality of individual dry cells which are located within a casing and electrically connected together to form a battery.

Standard dry cells are well known and commonly comprise cylindrical units having an output voltage of about 1.5 volts. It is also known to assemble a plurality of such cells in a common battery casing with appropriate series or parallel connections between the cells so as to provide a suitable electrical output at battery terminals.

Commonly, the battery is provided with external terminals and the battery casing is provided with internal connections to interconnect the cells with each other and with the external battery terminals. One such arrangement is shown, by way of example, in British Patent Specification No. 1331800.

Problems do however arise in providing suitable internal electrical connections within the battery casing. Previous proposals have involved the use of soldered wire joints or separate spring contacts which have to be fitted individually into position in the battery casing. The batteries have to be capable of withstanding shock and previous proposals have included pouring a suitable blocking material into the casing once the cells have been located in position so as to prevent movement of the battery cells. These previous proposals are inherently labour intensive in their construction and therefore expensive. Furthermore, the use of soldered joints and materials, such as bitumen, to hold the cells in place in the battery, tend to lead to the introduction of dirt during assembly.

It is an object of the present invention to provide improved internal connections within such a battery and an improved method of manufacturing such internal connections.

SUMMARY OF THE INVENTION

The present invention provides an electric battery comprising an insulating casing, a plurality of individual cells located within said casing, a pair of external terminals for effecting electrical connection to the battery, and a plurality of internal connections for interconnecting the cells with each other and with the external terminals, said internal connections being preformed as a single unitary conducting member, secured in position in the casing while still in unitary form, and subsequently severed in situ in the casing to form a plurality of separate internal connections.

In this way, the relative positions of the internal connections are predetermined by the manufacturing operation of the single unitary conducting member and provided the single unitary conducting member is accurately located in position in the casing, the separate internal connections will be accurately located in their respective positions within use of a labour intensive assembly process.

In a preferred embodiment, the single unitary conducting member is located on the inside of a lid of the battery casing.

Preferably the internal connections include a plurality of spring members arranged to engage the cells so that in the assembled battery, the spring members tend to retain the cells in a desired position.

Preferably the internal connections are formed from a single sheet member of electrically conducting material. Preferably the sheet member is formed of steel.

Preferably a plurality of securing means are provided in said battery casing for attaching the single unitary conducting member to the casing, at least one securing member being provided for each part of the unitary conducting member which forms a separate internal connection.

Preferably the internal connections are preformed on the unitary conducting member by a sequence of stamping operation. In one preferred embodiment, a plurality of parts of the unitary conducting member are bent out of the plane of the member so as to form a plurality of contact arms.

The invention also provides a method of manufacturing a plurality of internal connections for an electric battery which method comprises forming a plurality of internal connections on a single unitary conducting member, securing the unitary conducting member in position in part of a battery casing, and severing in situ in the casing the unitary conducting member into a plurality of separate internal connections.

Preferably the plurality of internal connections are formed as a unitary conducting member by a sequence of machining operations on a single sheet of electrically conducting material. Preferably the machining operations include a succession of stamping operations. The machining operations may also include bending operations to form conducting arms.

Preferably the method includes securing the unitary conducting member in a part of the casing by a plurality of connecting means, at least one connecting means being provided for each part which is to be severed to form a separate internal connection.

Preferably the unitary conducting member is secured in a lid of a battery casing.

Preferably the severing is effected by stamping. The stamping may be effected through the unitary conducting member and through part of the battery casing.

BRIEF DESCRIPTION OF THE DRAWINGS

FIG. 7 shows a manufacturing sequence used for making the member shown in FIG. 4.

DESCRIPTION OF THE PREFERRED EMBODIMENT

The battery shown in this example is of generally similar type to that described in British Patent Specification No. 1331800. In other words, it comprises an insulating casing containing four 1.5 volt dry cells which are interconnected to each other and to two external battery terminals by means of internal connections in a lid of the battery casing.

Figure 1:
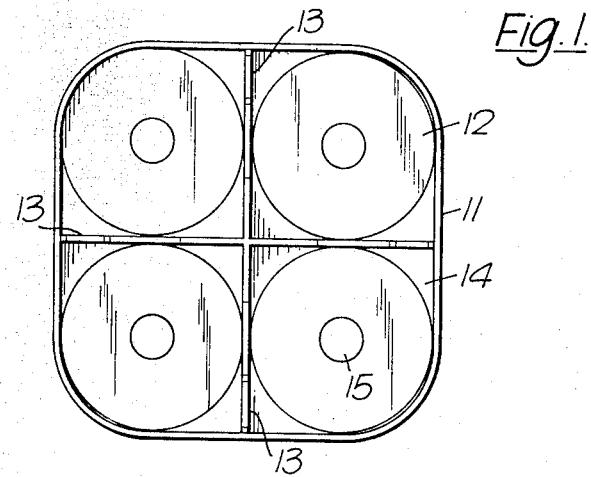
FIG. 1 is a plan view of a battery according to the present invention with the lid removed.
Figure 2:
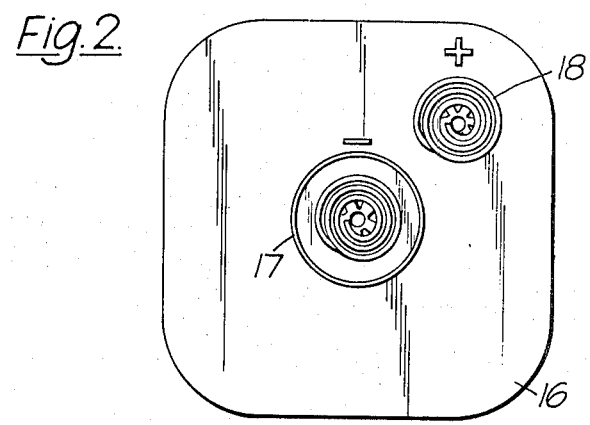
FIG. 2 is a plan view of the battery of FIG. 1 with the lid in position.

As shown in FIG. 1, the battery comprises a box-like casing 11 which houses four cylindrical cells 12. The casing 11 is provided with internal partition walls 13 which form four generally rectangular compartments 14, each of which houses a respective one of the cells 12. The battery casing and partition walls 13 are formed of insulating material and in this case thermoplastic plastics material. Each of the cells 12 is of conventional construction one terminal of which is provided by the casing of the cell and the other is provided by a central electrode 15 at its upper end. FIG. 2 shows the lid 16 of the casing. This is similarly formed of thermoplastics plastics material and has two external battery terminals 17 and 18 which form the negative and positive terminals respectively and each comprises a helical spring connected through the lid by a rivet.

In order to interconnect the cells in the battery and to connect them to the external terminals 17 and 18, a plurality of internal connections are provided on the lower face of the lid 16. The internal connections may be arranged to provide series, parallel or series parallel connections. In the particular example which will now be described, the internal connections provide series connections between the cells.

Figure 4:
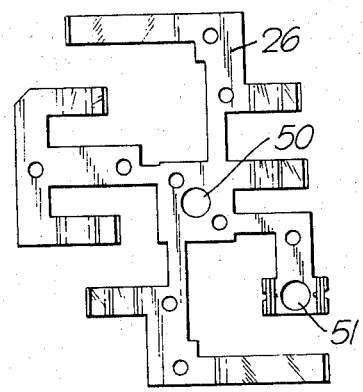
FIG. 4 shows a conducting member used to form internal connections in the battery.

All the internal connections are preformed on a single unitary electrically conducting member shown in FIG. 4. This is made by a sequence of operations which will now be described with reference to FIG. 7. FIG. 7 shows stages A to F of the manufacturing operation. A single plain strip 20 of electrically conducting material, which in this example comprises steel, is subjected to a succession of forming operations. As shown in FIG. 7, each stage of operation is carried out by a press tool and at stage A, a plurality of locating holes 21 are formed through the sheet together with two generally rectangular apertures 22. At stage B, a subsequent operation of the press tool forms further enlarged apertures through the sheet material. At stage C, the press tool forms more extensive apertures. At stage D, the edges of some projecting parts are upturned out of the plane of the sheet material as indicated at 23. At stage E, a machining operation is carried out to bend certain projecting arms along the broken lines marked 24 so that certain parts of the conducting sheet form inclined arms projecting out of the plane of the sheet. At stage F, the press tool carries out a piercing operation to separate the unitary conducting member 26 from the strip. The separated member is then as shown in FIG. 4.

Figure 5:
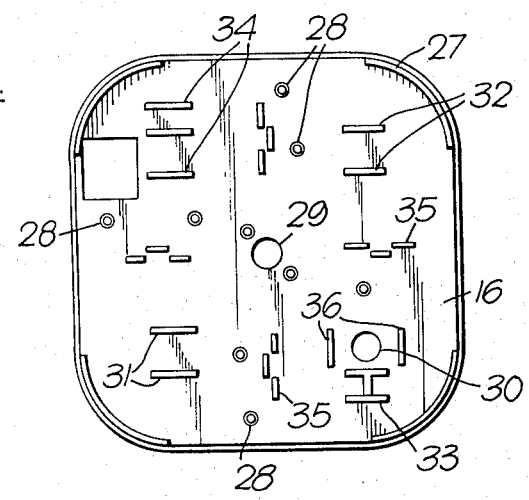
FIG. 5 is an underplan view of the battery lid prior to fixing the member shown in FIG. 4.

The lid is moulded so that the under face has the formation shown in FIG. 5. This includes downwardly projecting arcuate ribs 27 at each corner which are adapted to fit into the open upper end of the casing shown in FIG. 1. A plurality of downwardly projecting pegs 28 are provided and these are arranged to engage the locating holes 21 referred to in FIG. 7. A central aperture 29 and a further aperture 30 are provided for the passage of the rivets which hold the external terminals 17 and 18. A plurality of downwardly projecting stop members 31, 32, 33 and 34 are provided. Additionally, securing projections 35 are provided at four positions on the under face of the lid. The projections 35 are arranged to engage the upper edges of the partition walls 13 shown in FIG. 1. Two supporting ribs 36 are provided on opposite sides of the aperture 30 and are arranged to support the arms of the clip 44 when in position thereby preventing excessive opening of the arms.

Figure 6:
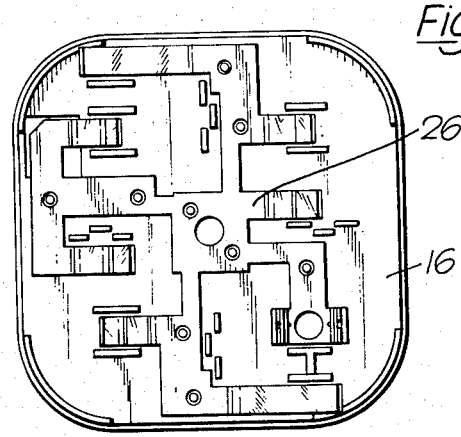
FIG. 6 is a view similar to that of FIG. 5 showing the conducting member of FIG. 4 in position.

In assembling the battery, the conducting member 26 is preformed as a unitary member as already described with reference to FIG. 7 and is then assembled in the lid of the casing as shown in FIG. 6. The steel plate is positioned with the holes 21 fitting over the projecting pegs 28. The pegs are then heat staked to retain the conducting plate 26 in position. Once the plate is securely positioned, the plate is severed, in situ in the lid, so as to separate the various internal connecting members. The severing is carried out by a piercing operation at the positions marked 37 in FIG. 3. This piercing is effective through the plate forming the conducting member 26 as well as the plastics lid 16. This has the effect of separating the conducting plate into five separate internal connecting members each of which is secured to the lid by two of the pegs 28. In this way, each of the separate internal connecting members is accurately positioned in the lid although only one single locating operation was necessary. This simplifies production and it ensures that each of the individual internal connecting members is accurately positioned and cannot be either misplaced or omitted.

Figure 3:
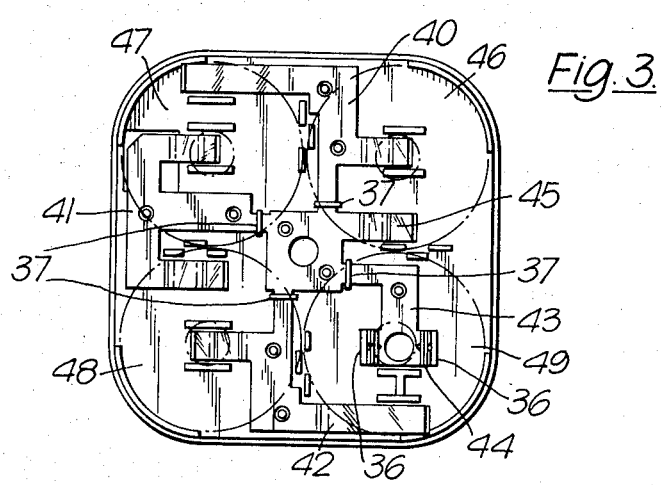
FIG. 3 is an underplan view of the battery lid showing the cell positions in broken lines.

The positions of the separate cells 12 in relation to the internal connections has been shown in broken lines in FIG. 3. Contact member 40 interconnects the central terminal of cell 46 to the casing of cell 47. Contact member 41 connects the central terminal of cell 47 with the casing of cell 48. Contact member 42 interconnects the central terminal of cell 48 with the casing of cell 49. Contact member 43 provides a U-shaped clip 44 which engages the central contact of cell 49 and provides a connection through the connecting rivet to external terminal 18. The central contact member 45 connects the casing of cell 46 to the external terminal 17 through the rivet securing the terminal 17.

The projections 31 and 32 on the underside of the lid provide stop members which limit the extent of axial movement of the cells within the battery when completed. The projections 33 and 34 carry out the same effect for the other two cells but additionally they provide a lateral guide for the long conducting arms of the contact members 40 and 42.

When the plate has been secured in the lid and the severing operation is carried out, the terminals 17 and 18 are secured by passing the rivets through holes 29 and 30 in the lid and corresponding holes 50 and 51 in the contact members 44 and 45. A plastic disc is positioned between the terminal 17 and the upper face of the lid 16 so as to cover the piercings in the plastic lid caused by the severing operation of the contact members from the conducting plate 26.

Due to the bending operations carried out in stage E of FIG. 7, the various internal contact members are provided with spring arms which engage the cells so as to maintain good electrical contact with the cells while accommodating minor variations in positioning of the cells.

It will be appreciated that by use of the above method of forming internal connections within the battery, the assembly procedure is greatly simplified and there is no need to solder or weld the intercell connections. Furthermore, the sequence of assembly operations is much reduced.

Once the lid has been completed as shown in FIG. 3, the lid is located in position on the lower part of the casing shown in FIG. 1 and the two are sealed together by ultrasonic welding. During this operation, the projections 27 become secured to the upper edges of the lower casing wall and the projecting members 35 on the underside of the lid 16 become welded to the upper edges of the partition walls 13 in the lower part of the casing.

The invention is not limited to the details of the foregoing example.

We claim:

1. A method of manufacturing a plurality of internal connections for an electric battery having a casing with a plurality of cell compartments for housing individual cells, which method comprises forming on a single unitary conducting member a plurality of internal connections having contact members for abutment with said cells so as to form electrical contact therewith, securing the unitary conducting member to part of the battery casing so that the contact members lie in predetermined positions relative to the cell compartments, and severing in situ in the casing the unitary conducting member into a plurality of separate internal connections by stamping through the unitary conducting member and simultaneously piercing through part of the battery casing.

2. A method according to claim 1 in which the plurality of internal connections are formed as a unitary conducting member by a sequence of machining operations on a single sheet of electrically conducting material.

3. A method according to claim 2 in which the machining operations include a succession of stamping operations.

4. A method according to claim 1 which includes securing the unitary conducting member in a part of the casing by a plurality of connecting means, at least one connecting means being provided for each part which is to be severed to form a separate internal connection.

* * * * *

UNITED STATES PATENT AND TRADEMARK OFFICE
CERTIFICATE OF CORRECTION

PATENT NO. : 4,253,232
DATED : March 3, 1981
INVENTOR(S) : Brian S. Bennett, Bruce A. A. Gray, Michael A. Todd It is certified that error appears in the above—identified patent and that said Letters Patent is hereby corrected as shown below:

Add the following:

-- [30] Foreign Application Priority Data

March 3, 1978 United Kingdom ..........8550/78--

Signed and Sealed this

Third Day of November 1981

[SEAL]

Attest:

GERALD J. MOSSINGHOFF

Attesting Officer   Commissioner of Patents and Trademarks